United States Patent [19]
Weakley

[11] 3,779,938
[45] Dec. 18, 1973

[54] METHOD FOR PROCESSING SCRAP FISSILE MATERIAL INTO A FORM SUITABLE FOR SHIPPING

[75] Inventor: Everett A. Weakley, Richland, Wash.

[73] Assignee: The United States of America as represented by the United States Atomic Energy Commission, Washington, D.C.

[22] Filed: Aug. 18, 1972

[21] Appl. No.: 281,662

[52] U.S. Cl..... 252/301.1 R, 252/301.1 W, 264/0.5
[51] Int. Cl.............................................. C09k 3/00
[58] Field of Search............. 252/301.1 W, 301.1 R

[56] References Cited
UNITED STATES PATENTS
3,012,385  12/1961  Hufft...................... 252/301.1 W X
3,513,100  5/1970   Stogner...................... 252/301.1 W Primary Examiner—Carl D. Quarforth
Assistant Examiner—R. L. Tate
Attorney—John A. Horan

[57] ABSTRACT

Scrap fissile materials and pyrophoric solids are added to a slurry of water and a nonburnable cementing material, masonry cement being preferred, and the resulting agglomeration is poured into a metal can. After the cementing material has been allowed to set to form a solid block within the can, the metal can is sealed with a metal lid. The scraps are thereby encapsulated in the solid cement block preventing exposure to the atmosphere and are held in a fixed lattice in the solid block thereby eliminating any fire hazard and eliminating any potential criticality. The scrap material, held in the billet so produced, is in a form suitable for safely shipping to a fuel scrap recovery plant which is located at a substantial distance from the place at which the scrap is produced. Upon arrival at the scrap recovery plant, the metal can is peeled from the solid block. The solid block is inserted whole or broken into smaller chunks and the chunks inserted into a high temperature oven and roasted to decompose the cementing material and convert the fissile material to the oxides. The fissile material is then leached from the oxides in the roasted product with acid which also decomposes any remaining cementing material. The fissile material is subsequently purified by extraction.

3 Claims, No Drawings

METHOD FOR PROCESSING SCRAP FISSILE MATERIAL INTO A FORM SUITABLE FOR SHIPPING

CONTRACTUAL ORIGIN OF THE INVENTION

This invention was made in the course of, or under, a contract with the United States Atomic Energy Commission.

BACKGROUND OF THE INVENTION

In the manufacturing processes for fabricating fuel elements for nuclear reactors, large amounts, running into several tons each year, of fissile material wastes and scraps are produced. These scraps are produced in several forms as a result of the various fabrication processes such as saw fines from sectioning extruded rods, lathe turnings from counter-bore operations, filings, extrusion heels, metallurgical samples, and some sludge from etch processes. A sufficient amount of fissile material is present in the large amounts of scrap which are produced during these fuel fabrication operations to permit and justify reprocessing of the scrap in order to recover the fissile material. However, the facilities and processing equipment necessary for the separation and purification of the fissile material is not likely to be located at or available near a fuel fabrication plant. The reprocessing equipment and associated facilities are also sufficiently complex, elaborate, and expensive that installation of the reprocessing equipment at locations where scrap will be produced is not practically or economically feasible. The scrap material must therefore be temporarily stored and subsequently shipped to a fuel recovery plant which may well be located at a substantial distance from the fuel fabrication plant at which the scrap material is produced. The scrap material produced during the fuel fabrication operations may contain substantial quantities of other materials such as zirconium and zirconium alloys, zircaloy-2 in particular, in addition to the fissile material. Since uranium, zirconium, and zircaloy-2 are pyrophoric metals and are particularly hazardous in the form of fines and chips with a large surface area as in the scrap, contact with air must be precluded by special handling procedures, storage, and shipping methods to prevent the possibility of a fire. The uranium metal particles are sufficiently enriched in uranium-235 that they present an additional nuclear safety hazard since the lattice spacing is not fixed and the particles can theoretically agglomerate accidentally into a critical mass unless only a very small amount is present.

The handling procedures, storage and shipping methods previously employed in dealing with these scrap fissile materials have proven to be unsatisfactory. The fissile materials and other pyrophoric solids produced as scraps have been placed in containers filled with water and maintained completely submersed to preclude contact with air. This storage under water is unsatisfactory both because of the potential fire hazard, particularly during hot summer months, and the inherent contamination potential and because there is no control over the aggregation of uranium in such containers giving rise to potential criticality. Criticality control considerations must therefore be based on a most reactive uranium water system for a particular enrichment which imposes severe restrictions on the quantity of material permitted in any one container. The scrap fissile material has been converted to a more stable form prior to shipment to the fuel recovery plant. The scrap material has been converted to the stable metallic oxides by deliberately burning it in a controlled facility called an "oxide burner." This method has not only proven unsatisfactory but has presented several hazardous potential problems which make an alternative method of shipping very desirable. The burning of uranium in the oxide burner presents inherent hazards to the operating personnel. In addition, burning of uranium to the oxide poses the problems of emission control as any release of uranium to the environment is undesirable. Other possible environmental pollutants in addition to uranium are likely to be given off in the oxidation process so that the oxidation facility must be operated under very stringent emission control standards. The installation and maintenance of the necessary equipment to meet the stringent standards is extremely costly so that a satisfactory alternative to the oxidation method is needed.

One possible alternative is conversion to a stable form by chemical methods. However, chemical methods are likewise expensive and also pose other characteristic problems. Emission control must again be considered to prevent possible air pollution such as with nitrogen oxides. Pyrophoric particles of zirconium and zircaloy-2 will still remain after dissolution of the uranium. Potential explosive hazards are present in nitric acid with intermetallic uranium-zirconium compounds in the uranium to zircaloy-2 bonds. Since any chlorides or fluorides in the material shipped are undesirable due to possible corrosion problems with the processing equipment at the scrap recovery plant, use of HCl or HF solutions to dissolve the uranium and zirconium is thus prohibited. Chemical methods to convert the scraps to a stable form are therefore unsatisfactory.

Therefore, it is an object of the present invention to provide a method of shipping fissile materials and pyrophoric solids which eliminates the hazards of fire and accidental criticality.

An object of the present invention is a method of processing fissile materials and pyrophoric solids into a form suitable for shipping without the potential hazards of fire or accidental criticality.

A further object of the present invention is to provide a method of processing fissile material and pyrophoric solid scraps produced during the fabrication of nuclear reactor fuel into a form suitable for shipping to a place where the fissile material will be recovered and reprocessed.

It is an object to provide such a method where the fissile material will be recovered and reprocessed at a point which is located at a substantial distance from the point at which the scraps are produced.

An additional object of the present invention is to provide a method of processing fissile material and pyrophoric solids into a form suitable for safe shipping which will permit easy recovery of the fissile material for reprocessing.

SUMMARY OF THE INVENTION

In accordance with the method of the present invention pyrophoric scrap fissile material is processed into a form suitable for safely shipping to a scrap recovery plant which is located at a substantial distance from the place at which the pyrophoric scrap is produced. A slurry of water and a non-burnable cementing material is formed and the scrap is added to the slurry as aggregate. The slurry containing the scrap as aggregate is poured into a metal can and the cementing material allowed to set. After the cementing material has hardened to form a solid block within the can, the metal can is sealed with a metal lid. The pyrophoric material is encapsulated within the solid block, isolation from the atmosphere eliminating the potential of a fire, and the fissile material is held in a fixed lattice eliminating any potential criticality.

Further in accordance with the method of the present invention, masonry cement is employed as the nonburnable cementing material. Use of masonry cement facilitates recovery of the fissile material at the scrap recovery plant. After the metal can has been peeled from the solid block and the solid block broken into smaller chunks, the chunks are roasted in a high temperature oven wherein the masonry cement decomposes and the fissile material is converted to an oxide. When the fissile material is leached from the oxides in the roasted product with acid for subsequent purification by extraction, any remaining masonry cement is decomposed by the acid.

DESCRIPTION OF THE INVENTION

Wastes and scraps of fissile materials and pyrophoric solids produced in the manufacturing processes for fabricating fuel elements for nuclear reactors are gathered and temporarily stored until a sufficient amount has accumulated to warrant processing in accordance with the method of the present invention. Wastes and scraps of uranium and scraps of zirconium and zirconium alloys, zircaloy-2 in particular, are so produced as lathe turnings from counter-bore operations, saw fines from sectioning extruded rods, filings, extrusion heels, metallurgical samples and other test samples, and sludge from etch processes. The small pieces and fines of uranium, zirconium and zircaloy-2 are all pyrophoric. In processing these scraps in accordance with the method of the present invention, a slurry of water and a nonburnable cementing material is prepared. A nonburnable cementing material is chosen to reduce the potential hazards of a fire and to prevent the potential release of uranium to the environment in the event of an accident which could also subject the shipping container to a resulting fire. Examples of nonburnable cementing materials which could be used are: plaster of paris, with an approximate chemical composition of $(CaSO_4)_2 \cdot H_2O$; Portland cement type II, with an approximate chemical composition of 43% $3 CaO \cdot SiO_2$, 30% $2 CaO \cdot SiO_2$, 13% $4 CaO \cdot Al_2O_3 \cdot Fe_2O_3$, 6% $3 CaO \cdot Al_2O_3$, 3% $CaSO_4$, and 3% $MgO$; and masonry cement, with an approximate chemical composition of 50% Portland cement type II, 47% limestone ($CaCO_3$), and 3% gypsum ($CaSO_4 \cdot 2H_2O$). All three of these nonburnable cementing materials harden by hydration and with some hydrolysis upon the addition of water. The scraps are mixed with the slurry and serve as aggregate in the cement mixture. The nonburnable cementing material, water, and scrap aggregate are combined in such proportions that the mixture assumes the consistency of construction concrete. The concrete mixture is continuously stirred as the components are combined in order to obtain a uniform distribution of the fissile material throughout the mixture. The concrete mixture is allowed to set to permit the cementing material to harden to form a solid block. The pyrophoric solids are encapsulated by the cementing material in the hardened block and exposure to the air is thereby precluded. The fissile material is further held in a fixed lattice in the solid block preventing any rearrangement of the material and eliminating any potential criticality. The pyrophoric solids and fissile materials can be safely stored in this form and the solid block can be easily handled and safely shipped.

Preferably, the wet concrete mixture is poured into a metal can and allowed to harden to form a solid block within the can. Subsequently, the metal can is sealed with a metal lid further isolating the scraps from the atmosphere and offering additional protection against fire or release of material in the event of an accident. The scraps, contained in the solid block within the sealed metal can, or billet, are in a form which can be readily handled and shipped as well as safely stored for a period of time without concern about potential fire or criticality. The billets can be easily shipped long distances if necessary as the scraps are held in a stable form. The billets can be handled individually but generally several are packed into a larger container such as in a wooden box for shipping. After the billets have arrived at the location at which the fissile material is to be recovered from the scrap, the metal can is peeled from the solid concrete block. The solid cement blocks are crushed and the fissile material is recovered from the scrap by roasting in a high temperature flame oven to convert the uranium to an oxide with subsequent leaching of the uranium from the oxide with acid and purification by extraction. In the preferred embodiment of the present invention, masonry cement is employed as the nonburnable cementing material. Masonry cement is preferred both because it is less expensive and hence more economically attractive, and because of the relative ease with which the uranium can be recovered from the solid cement block. After the metal can has been peeled from the solid cement block, the block can be broken into smaller chunks or inserted as a whole into the high temperature oven. The temperature reached in the oven is high enough that the masonry cement will begin to decompose. As the fissile material and other pyrophoric solids oxidize, the temperature will rise even higher promoting further decomposition of the masonry cement. Masonry cement is also preferred because it will more easily dissolve in acid releasing carbon dioxide from the limestone, $CaCO_3$, content. Therefore any masonry cement remaining after roasting in the high temperature oven will be further decomposed by the acid when the fissile material is leached in the acid treatment step. Since masonry cement is composed of several species with good neutron capture cross sections, the masonry cement offers the advantage of serving as an additional control on criticality.

EXAMPLE

Scrap produced in the manufacturing processes for fabricating fuel elements at a fuel fabrication plant located at Richland, Washington, were processed in accordance with the method of the present invention and shipped to a fuel recovery plant located at Fernald, Ohio, for recovery of the uranium. Uranium lathe turnings or chips and uranium bearing abrasive saw fines were collected and temporarily stored in 30-gallon water filled drums to prevent metal fires. The uranium chips were approximately 0.005 inch thick highly crinkled ribbons up to 0.3 inch wide and 6 inches long. The lathe chips were approximately 98.5 weight percent uranium, 1.0 weight percent zircaloy-2, and 0.4 weight percent copper-silicon alloy. The abrasive saw fines analyzed about 65 weight percent uranium and consisted primarily of a mixture of uranium, uranium oxides, zircaloy-2, zirconium dioxide, copper-silicon alloy, silicon carbide grit and wheel matrix material. A three cubic foot utility cement mixer was used for blending the uranium scrap, cement, and water. The water under which the uranium had been stored was drained from the drums and weighings were conducted in order to determine the amount of uranium present as criticality considerations limit the amount of uranium permitted in the mixer to a safe mass for a particular enrichment. The uranium chips were dumped into the mixer and saw fines were added until there was an approximate 3 to 1 ratio of chips to saw fines. Masonry cement and water were also introduced into the mixer until the mixture assumed the consistency of construction concrete. The wet concrete was poured into cans, and any exposed chips were tamped under the surface. The can was vibrated to remove air bubbles and puddled to form a concrete cap on top of the chips. The masonry cement was then allowed to set and harden for seven days. Two sizes of cans were used, both being right circular cylinders of approximately 0.010 inch thick steel walls with slip lids. The smaller steel can had a 9⅞ inch inner diameter, was 10¼ inches high and held about 0.45 cubic foot of mixture. The larger can was slightly tapered with an 11¼ inch inner diameter base and a 12¼ inch inner diameter mouth and was 15½ inches high holding about 0.97 cubic foot of mixture. Average total weight was 48 pounds for a smaller can and 118 pounds for a larger can. After the seven day set, the steel cans were sealed with the slip lids and the lids secured with fabric reinforced tape. The billets, sealed metal cans containing the solid mass of concrete and scrap, were loaded into wooden shipping crates, several billets to a crate and shipped to the scrap recovery plant at Fernald, Ohio. After the steel cans had been peeled from the cement blocks at the scrap recovery plant, the blocks were broken into smaller chunks and inserted or inserted whole into a high temperature direct fired gas flame oven. The temperature in the oven was high enough to decompose the masonry concrete and convert the uranium and zircaloy-2 to the metal oxides. Following roasting, the roasted material was screened using an 8-mesh screen, the material retained by the 8-mesh screen being milled until it passed through a 100-mesh screen and then recycled back through the oven for further roasting. The material passing through the 8-mesh screen was then tranferred to the uranium recovery equipment for dissolution with acid and recovery and purification of the uranium by extraction.

The embodiments of the invention in which an exclusive property or privilege is claimed are defined as follows:

1. A method for processing small pieces of scrap fissile materials and pyrophoric solids produced during the fabrication of nuclear reactor fuel into a form suitable for shipment and subsequently recovering the fissile material comprising: forming a slurry of water and masonry cement; adding small pieces of the scrap fissile materials and pyrophoric solids to the slurry as aggregate; pouring said slurry and said aggregate into a metal can; hardening the cementing material within said can to form a solid block encapsulating the fissile materials and pyrophoric solids in a fixed lattice from which the fissile material can be subsequently recovered; sealing said can with a metal lid; shipping said can containing said encapsulated fissile materials to a point of recovery; removing said solid block from said can; and recovering said fissile material from said solid block by roasting and leaching with acid whereby said fissile materials can be purified by extraction.

2. The method according to claim 1 wherein said fissile material is uranium and said pyrophoric solids include zirconium, zirconium alloys, and uranium.

3. In a method for recovering fissile material from pyrophoric scrap produced during the fabrication of nuclear reactor fuel wherein the scrap recovery plant is located at a substantial distance from the place at which the pyrophoric scrap is produced, the improvement comprising:
  a. forming a slurry of water and masonry cement;
  b. adding said pyrophoric scrap to the slurry as aggregate;
  c. pouring the slurry containing the pyrophoric scrap aggregate into a metal can;
  d. permitting said masonry cement to set to form a solid block;
  e. sealing said metal can with a metal lid; and
  f. shipping the metal can containing the so encapsulated pyrophoric scrap to the scrap recovery plant; and recovering the fissile material by:
    i. peeling the metal can from the solid block;
    ii. breaking the solid block into smaller chunks;
    iii. roasting the chunks in a high temperature oven to decompose the masonry cement and convert the fissile materials to oxides; and
    iv. simultaneously decomposing any remaining masonry cement and leaching the fissile materials from the oxides in the roasted product with acid.

* * * * *